(12) United States Patent
Lu et al.

(10) Patent No.: US 8,727,655 B2
(45) Date of Patent: May 20, 2014

(54) FOLDING CHAIR SAFETY LOCK

(75) Inventors: Ming Chin Lu, Taipei (TW); Guo Biao Qiu, Guangzhou (CN); Shang Jen Liu, Taipei (TW); Tung Yang Chen, Taipei (TW)

(73) Assignee: Atico International USA, Inc., Fort Lauderdale, FL (US)

( * ) Notice: Subject to any disclaimer, the term of this patent is extended or adjusted under 35 U.S.C. 154(b) by 0 days.

(21) Appl. No.: 13/231,723

(22) Filed: Sep. 13, 2011

(65) Prior Publication Data

US 2012/0141195 A1 Jun. 7, 2012

Related U.S. Application Data

(60) Provisional application No. 61/382,185, filed on Sep. 13, 2010.

(51) Int. Cl.
*A47C 4/30* (2006.01)

(52) U.S. Cl.
USPC ............ 403/109.6; 403/316; 403/379.2; 297/19

(58) Field of Classification Search
USPC .......... 403/109.1–109.3, 109.6, 109.8, 317, 403/318, 322.4, 324, 325, 330, 328, 378, 403/379.5; 297/19, 22, 23, 55, 58; 135/120.3

See application file for complete search history.

(56) References Cited

U.S. PATENT DOCUMENTS

| | | | |
|---|---|---|---|
| 2,233,749 A | 3/1941 | Irving | |
| 2,739,361 A * | 3/1956 | Elsner | 24/635 |
| 3,319,997 A | 5/1967 | Napoleon | |
| 4,329,078 A * | 5/1982 | Crates et al. | 403/316 |
| 4,536,026 A | 8/1985 | Cornell | |
| 4,586,399 A * | 5/1986 | Kassai | 74/551.3 |
| 5,035,527 A * | 7/1991 | Cheng | 403/109.5 |
| 5,054,848 A | 10/1991 | Liu | |
| 5,707,105 A | 1/1998 | Liu | |
| 6,045,177 A | 4/2000 | Grace | |
| 6,206,462 B1 * | 3/2001 | Huang | 297/39 |
| 6,517,151 B2 * | 2/2003 | Liu | 297/16.1 |
| 6,536,839 B2 * | 3/2003 | Liu | 297/39 |
| 6,595,582 B1 * | 7/2003 | Liu | 297/35 |
| 6,827,395 B1 | 12/2004 | Wang et al. | |
| 7,040,832 B2 * | 5/2006 | Hsieh | 403/109.3 |
| 7,086,694 B1 | 8/2006 | Huang | |
| 7,219,955 B2 | 5/2007 | Lu et al. | |
| 7,293,826 B2 | 11/2007 | Lu et al. | |
| 7,328,942 B1 | 2/2008 | Wu | |
| 7,637,276 B2 * | 12/2009 | Mallookis et al. | 135/144 |
| 7,717,502 B2 * | 5/2010 | Deng | 297/23 |
| 7,784,861 B1 * | 8/2010 | Deng | 297/23 |
| 7,849,867 B2 * | 12/2010 | Takayama | 135/114 |
| 7,874,303 B2 * | 1/2011 | Xie | 135/120.3 |
| 2006/0186712 A1 | 8/2006 | Lu et al. | |
| 2007/0012346 A1 * | 1/2007 | Choi | 135/114 |

FOREIGN PATENT DOCUMENTS

KR 10-2006-0007620 A 1/2006

* cited by examiner

*Primary Examiner* — Joshua Kennedy
(74) *Attorney, Agent, or Firm* — Casimir Jones SC

(57) ABSTRACT

Devices for safely locking collapsible furniture in a fixed configuration. In particular, locks for collapsible furniture which are automatically engaged and require multiple affirmative steps to unlock.

2 Claims, 5 Drawing Sheets

Locked

Locked

Slides Freely

FOLDING CHAIR SAFETY LOCK

The present application claims priority to U.S. Provisional Patent Application Ser. No. 61/382,185, filed Sep. 13, 2010, the disclosure of which is herein incorporated by reference in its entirety.

FIELD OF THE INVENTION

The present invention relates to devices for safely locking collapsible furniture in a fixed configuration. In particular, the present invention provides locks for collapsible furniture which are automatically engaged and require multiple affirmative steps to unlock.

BACKGROUND OF THE INVENTION

Folding and/or collapsible furniture is used widely as temporary or recreational seating because it can be constructed of lightweight materials, and can be folded into a smaller volume for transportation or storage. Folding and/or collapsible furniture can include conventional folding chairs (See, e.g., U.S. Pat. No. 2,233,749, herein incorporated by reference in its entirety), collapsible chairs (See e.g., U.S. Pat. No. 6,045,177, herein incorporated by reference in its entirety), lawn chairs (See, e.g., U.S. Pat. No. 4,536,026, herein incorporated by reference in its entirety), collapsible and/or folding tables, etc. Folding and/or collapsible furniture is generally at least partially unstable. Misapplied forces can result in unintended collapse of the furniture, and potentially to injury to users. For example, when a force is applied to the rear of the seat of a conventional folding chair, the chair collapses easily and can be very dangerous. Furthermore, a folding chair is easy to collapse to clamp a child when the child stands on the folding chair. Folding furniture can also pose threat during transportation and storage, as the furniture can fall out of a collapsed configuration causing injury to a user, or can pinch a user as it folds and unfolds.

Safety devices have been developed to mitigate the dangers associated with unintended collapse of folding and/or collapsible furniture (See, e.g., U.S. Pat. No. 3,319,997; U.S. Pat. No. 5,054,848; U.S. Pat. No. 5,707,105; U.S. Pat. No. 6,206,462; U.S. Pat. No. 6,517,151; U.S. Pat. No. 6,536,839; U.S. Pat. No. 6,595,582; U.S. Pat. No. 6,827,395; U.S. Pat. No. 7,086,694; herein incorporated by reference in their entireties). However, previous safety devices suffer from the shortcomings that they must be affirmatively engaged, can inadvertently be unlocked, and/or can be readily unlocked by a child. The field is in need of a device which overcomes these shortfalls.

SUMMARY OF THE INVENTION

In some embodiments, the present invention provides a locking device comprising: a first mechanism, wherein the first mechanism has a locked conformation and an unlocked conformation; a second mechanism, wherein the second mechanism has a locked conformation and an unlocked conformation; a locking mechanism, wherein the locking mechanism has a locked conformation and an unlocked conformation; and a support engagement element, and wherein the support engagement element attaches the locking device to a support element. In some embodiments, the locked conformation of the locking mechanism impedes movement of the locking device along the support element, the locked conformation of the second mechanism impedes unlocking of the locking mechanism, and the locked conformation of the first mechanism impedes unlocking of the second mechanism. In some embodiments, unlocking of the first mechanism allows unlocking of the second mechanism, unlocking of the second mechanism unlocks the locking mechanism, and unlocking of the locking mechanism allows movement of the locking device along the support element. In some embodiments, the first mechanism must be unlocked prior to unlocking the second mechanism, unlocking the second mechanism results in unlocking the unlocking mechanism, and the unlocking mechanism must be unlocked prior to movement of the locking device along the support element.

In some embodiments, the locking mechanism comprises a bolt, the support element comprises one or more bores, and the locked conformation of the locking mechanism comprises insertion of said bolt into said bore. In some embodiments, the bolt automatically inserts into a bore upon proper alignment of the bolt with one of the bores. In some embodiments, unlocking the first mechanism requires an affirmative step, and unlocking the second mechanism requires a second affirmative step. In some embodiments, the first mechanism comprises a slidable cover. In some embodiments, the second mechanism comprises a push-button. In some embodiments, the locked conformation of the slidable cover impedes access to or movement of the push-button. In some embodiments, the slidable cover automatically adopts a locked conformation, wherein an affirmative step is required to move the slidable cover into an unlocked position, and wherein moving the sliadable cover into an unlocked position unlocks the first mechanism and provides access to the push-button. In some embodiments, the affirmative step of depressing the push-button, unlocks the second mechanism thereby unlocking the locking mechanism. In some embodiments, depressing the push-button withdraws the bolt from a bore. In some embodiments, the affirmative step to move the sliadable cover into the unlocked position, and the affirmative step of depressing the push button, unlock the locking mechanism and allow movement of the locking device along the support element only when performed in sequential order. In some embodiments, movement of the locking device along the support element comprises movement over the support element. In some embodiments, the locking device is attached to a first portion of the support element, and movement of the locking device along the support element comprises movement of the locking device and the first portion of the support element over a second portion of the support element.

In some embodiments, the present invention provides a piece of furniture comprising the locking device as described above, wherein movement of the locking device along the support element is required for movement of the piece of furniture from a first conformation to a second conformation. In some embodiments, the locked position of the locking mechanism restricts movement from the first conformation to the second conformation. In some embodiments, the unlocked position of the locking mechanism allows movement from a first conformation to a second conformation. In some embodiments, the first conformation comprises an open conformation and the second conformation comprises a closed conformation. In some embodiments, the first conformation comprises a closed conformation and the second conformation comprises an open conformation.

DEFINITIONS

As used herein, the terms "closed" (e.g. "closed configuration," "closed position," "closed conformation," etc.), "folded," and "collapsed" are used synonymously to in reference to a configuration of a piece of furniture (e.g. table, chair, etc.). A piece of furniture generally adopts a "closed configuration" when not in use, for storage, and/or transportation. The "closed configuration" is generally more compact than the configuration adopted in when in active use.

As used herein, the terms "open" (e.g. "open configuration," "open position," "open conformation," etc.), "unfolded," and "expanded" are used synonymously to in reference to a configuration of a piece of furniture (e.g. table, chair, etc.). A piece of furniture generally adopts an "open configuration" when in use (e.g. in use as a piece of furniture). The "open configuration" is generally more expanded than the "closed configuration."

As used herein, the term "affirmative step" refers to a step in a process which must be actively taken by a user. An "affirmative step" does not happen automatically or as the result of a prior step in a process.

As used herein, the term "automatically" refers to a step or process which initiates and/or is carried out without an affirmative step being taken by a user. Commonly, an "automatic step" or "automatic process" will initiate and/or complete "automatically" following completion of some other step. For example, a lock may "automatically" engage, upon reaching proper alignment along a support element, without the need for an affirmative step to engage the lock.

DETAILED DESCRIPTION OF THE INVENTION

The present invention relates to devices for safely locking collapsible furniture in a fixed configuration. In particular, the present invention provides locks for collapsible furniture which are automatically engaged and require multiple affirmative steps to unlock. In some embodiments, devices lock collapsible and/or folding furniture into a closed configuration (e.g. collapsed, folded, storage position, transport configuration, etc.). In some embodiments, devices lock collapsible and/or folding furniture into an open configuration (e.g. expanded position, seating configuration, active-use configuration, etc.). In some embodiments, devices lock collapsible and/or folding furniture into a closed and/or open configuration. In some embodiments, the present invention provides devices which can be attached to collapsible and/or folding furniture. In some embodiments, the present invention provides devices which can be integrated into collapsible and/or folding furniture. In some embodiments, the present invention provides collapsible and/or folding furniture with an integrated locking device (e.g. a locking device that engages automatically and requires two or more affirmative steps to unlock). In some embodiments, the present invention provides collapsible and/or folding furniture comprising a locking device that engages automatically, locking the furniture into an open and/or closed configuration, and requires two or more affirmative steps to unlock the device and reconfigure (e.g. fold or unfold) the furniture. In some embodiments, a locking device of the present invention finds use with any suitable piece of furniture, for example: folding chair, collapsible chair, camping chair, lawn chair, children's chair, card table, foldable table, portable table, collapsible table, etc.

In some embodiments, a locking device automatically engages and locks a piece of furniture into an open configuration upon opening the piece of furniture. In some embodiments, placing a piece of furniture into an open configuration causes the locking device to automatically engage, thereby locking the furniture into the open configuration. In some embodiments, a locking device automatically engages and locks a piece of furniture into a closed configuration upon closing the piece of furniture. In some embodiments, placing a piece of furniture into a closed configuration causes the locking device to automatically engage, thereby locking the furniture into the closed configuration. In some embodiments, the automatic locking mechanism cannot be overridden.

In some embodiments, a locking device must be affirmatively unlocked, in order to move a piece of furniture from an open configuration to a closed configuration. In some embodiments, a locking device must be affirmatively unlocked, in order to move a piece of furniture from a closed configuration to an open configuration. In some embodiments, a user affirmatively unlocks a device of the present invention by taking active steps to disengage the locking mechanism, thereby allowing a piece of furniture to be moved (e.g. reconfigured) from one configuration to another (e.g. closed to open, open to closed). In some embodiments, unlocking a device of the present invention requires at least two affirmative steps. In some embodiments, the requirement of multiple affirmative steps for unlocking greatly reduces (e.g. reduced beyond the point of significance) the possibility of inadvertent unlocking.

Figure 2:
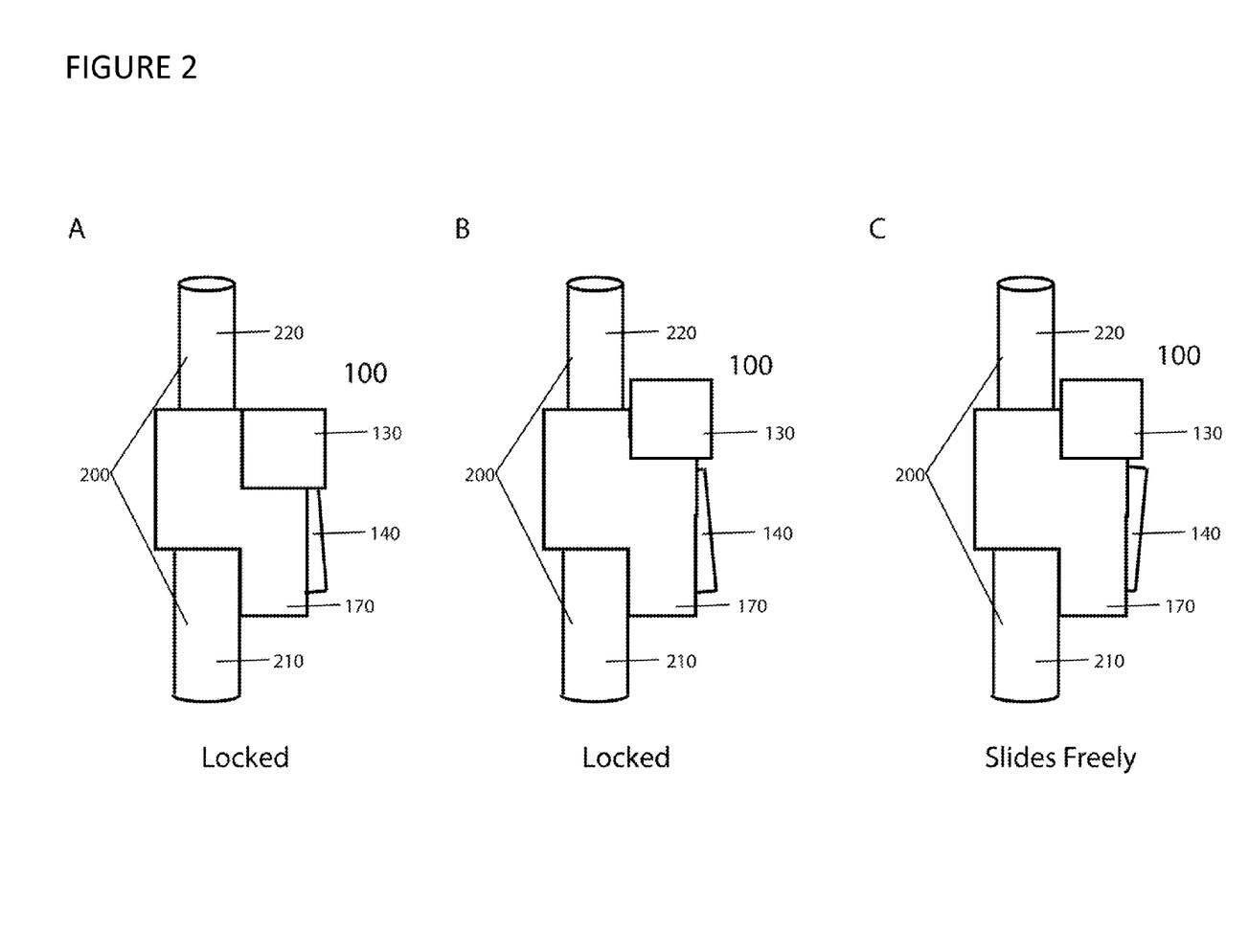
FIG. 2 shows illustrations of an exemplary locking device and support element: (A) the locking device is in the locked position with the cover slide impeding movement of the pin disengagement button; (B) the locking device is in the locked position, but the cover slide has been affirmatively moved allowing access to the pin disengagement button; (C) the locking device is in the unlocked position with the cover affirmatively moved allowing access to the pin disengagement button, and the disengagement button depressed.
Figure 3:
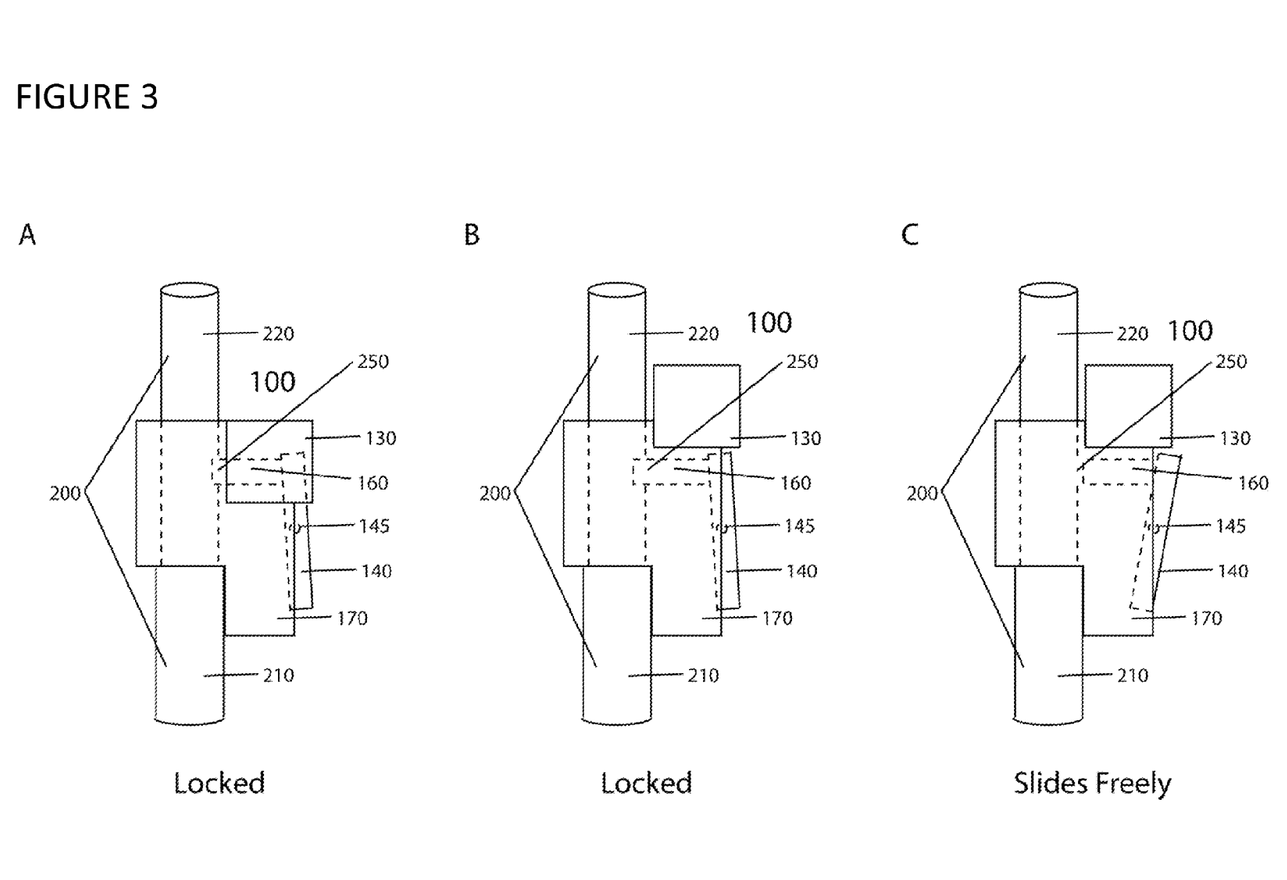
FIG. 3 shows illustrations of an exemplary locking device and support element: (A) the locking device is in the locked position with the pin inserted into the bore, the cover slide impedes movement of the pin disengagement button; (B) the locking device is in the locked position, with the pin inserted into the bore, but the cover slide has been affirmatively moved allowing access to the pin disengagement button; (C) the locking device is in the unlocked position, with the pin withdrawn from the bore, the cover is affirmatively moved allowing access to the pin disengagement button, and the disengagement button is depressed.

In some embodiments, two or more affirmative steps must be taken sequentially to unlock the device and move the furniture from one configuration (e.g. open or closed) to another (e.g. closed or open) (SEE FIGS. 2-3). In some embodiments, a first affirmative unlocking mechanism unlocks a second affirmative unlocking mechanism. In some embodiments, a second unlocking step cannot be taken until a first unlocking mechanism has been disengaged. In some embodiments, unlocking a device of the present invention requires: (1) disengaging a first locking mechanism, which unlocks a second mechanism; (2) disengaging a second mechanism, which unlocks the piece of furniture; and (3) moving the furniture out of the engageable and/or lockable position (e.g. open or closed). In some embodiments, unlocking or disengaging steps must be taken in sequential order. In some embodiments, a piece of furniture cannot be reconfigured until multiple affirmative steps have been taken in order (e.g. 2 affirmative steps, 3 affirmative steps, 4 affirmative steps, 5 affirmative steps, etc.).

Figure 4:
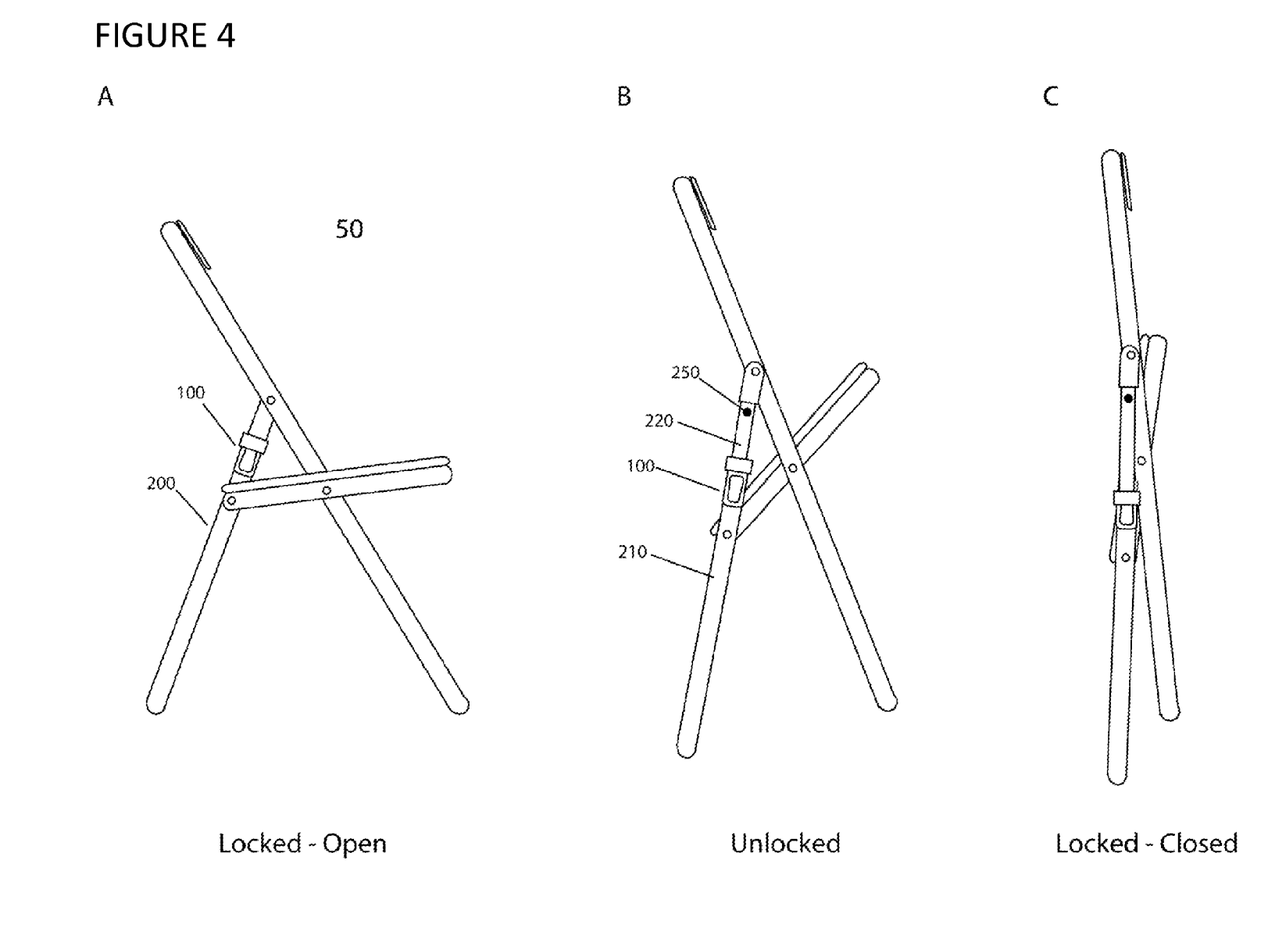
FIG. 4 shows illustrations of an exemplary folding chair with a locking device: (A) The chair is locked in the open position, and the locking device is in the locked position with the cover slide impeding movement of the pin disengagement button; (B) the chair is being repositioned, the cover of the locking device has been affirmatively moved allowing access to the pin disengagement button, and the disengagement button depressed, allowing movement of the locking device and outer support along the inner support; (C) the chair is locked in the folded position, and the locking device is in the locked position with the cover slide impeding movement of the pin disengagement button.
Figure 5:
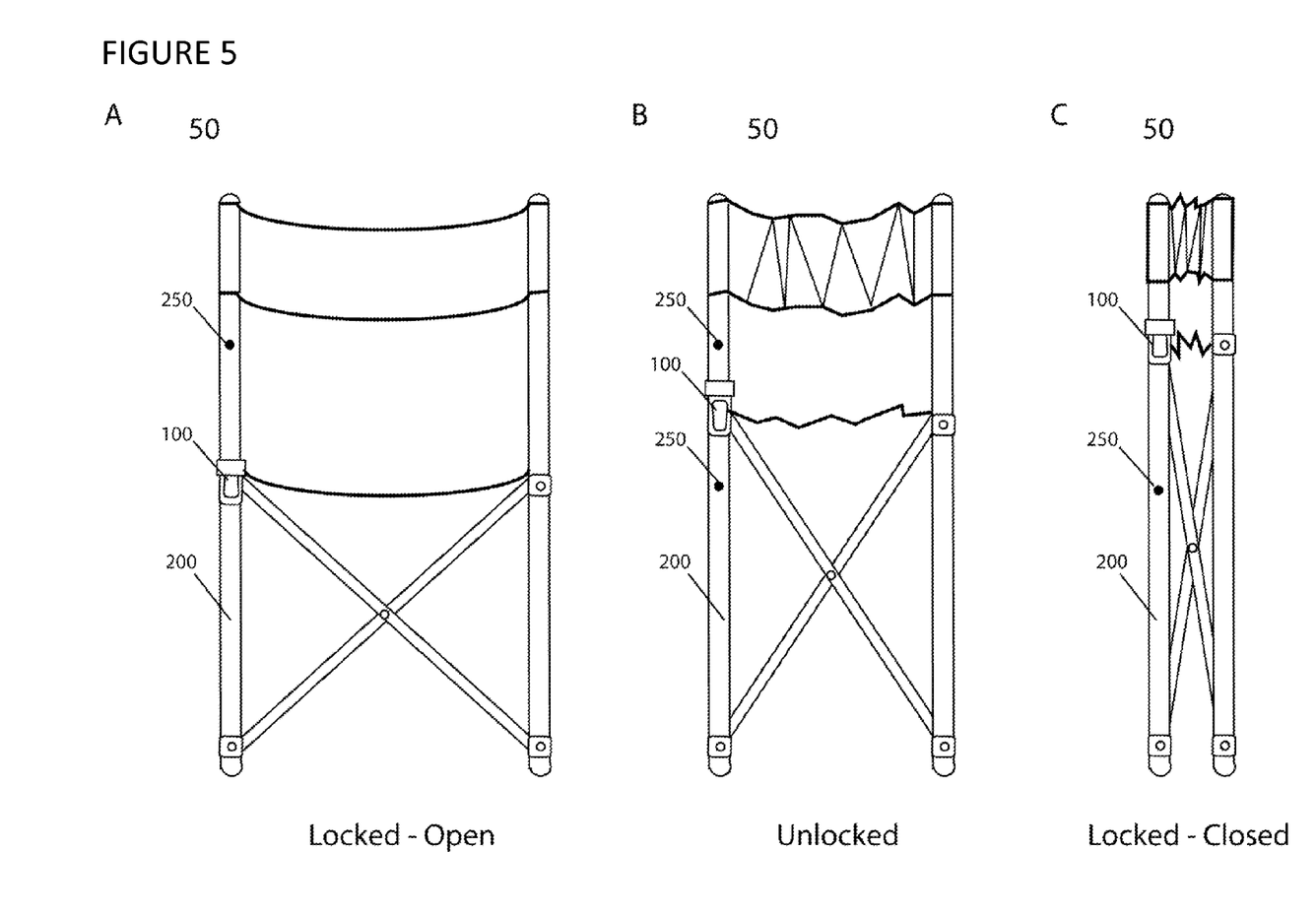
FIG. 5 shows illustrations of an exemplary collapsible chair with a locking device: (A) The chair is locked in the open position, and the locking device is in the locked position with the cover slide impeding movement of the pin disengagement button; B) the chair is being repositioned, the cover of the locking device has been affirmatively moved allowing access to the pin disengagement button, and the disengagement button depressed, allowing movement of the locking device along the support; (C) the chair is locked in the collapsed position, and the locking device is in the locked position with the cover slide impeding movement of the pin disengagement button.

In preferred embodiments, a locking device 100 of the present invention attaches to, is part of, and/or is integrated into one or more support elements 200 (e.g. leg, leg portion, etc.) of a piece of furniture 50 (SEE FIGS. 4-5). In some embodiments, a support element 200 comprises a shaft with a bore 250 at a point along its length. In some embodiments, conversion of a piece of furniture 50 from one conformation to another conformation requires movement of a locking device 100 along a support element 200. In some embodiments, conversion of a piece of furniture from one conformation to another conformation requires movement of a portion of a support element 200 through a locking device 100. In some embodiments, conversion of a piece of furniture from one conformation to another conformation requires movement of a first portion 210 of a support element 200, to which a locking device 100 is attached, along a second portion 220 of a support element. In some embodiments, a support element comprises a shaft with more than one bores 250 disposed linearly along the length of the shaft. In some embodiments, a locking device 100 of the present invention comprises a pin or bolt 160. In some embodiments, when the locking device 100 is properly aligned with a bore 250 along the support element 200, the pin or bolt 160 is aligned with the bore 250, and the pin or bolt 160 is configured to insert into the bore 250, thereby locking the position of the device 100 along the support element 200 (SEE FIG. 3). In some embodiments, a locking device 100 comprises a bias device (e.g. a spring), attached to the pin or bolt 160, which causes the pin or bolt 160 to automatically extend when not blocked from extension and/or manually retracted. In some embodiments, an affirmative step is required to act against the force applied by a bias device (e.g. a spring) on the the pin or bolt 160, in order to retract the pin or bolt 160. In some embodiments, a locking device 100 comprises a bias device (e.g. a spring), attached to the pin or bolt 160, which causes the pin or bolt 160 to automatically insert into a bore 250 along the support element 200, when properly aligned. Insertion of the pin or bolt 160 into a bore 250 in the support element precludes movement of the locking device 100 along the length of the support element 200. In some embodiments, insertion of a pin or bolt 160 into a bore 250 in the support element 200 places the support element 200 and locking device 100 into a locked and/or engaged conformation. In some embodiments, a locked and/or engaged conformation denies movement of a support element 200 from closed to open and/or open to closed conformations.

In some embodiments, a support element 200 comprises at least a first portion 210 and a second portion 220. In some embodiments, a first portion 210 of a support element 200 comprises a first shaft 210. In some embodiments, a second portion 220 of a support element comprises a second shaft 220. In some embodiments, a second shaft 220 slidably fits within a first shaft 210. In some embodiments, conversion of a piece of furniture 50 from one conformation to another conformation requires movement of a locking device 100 and a first shaft 210 of a support element 200 along a second shaft 220 of a support element 200. In some embodiments, conversion of a piece of furniture 50 from one conformation to another conformation requires movement of a support element 200 through a locking device 100. In some embodiments, conversion of a piece of furniture 50 from one conformation to another conformation requires movement of a first portion 210 (e.g. shaft) of a support element 200, to which a locking device 100 is attached, along a second portion 220 of a support element 200. In some embodiments a second shaft 220 comprises a bore 250 at a point along its length. In some embodiments, a second shaft 220 comprises two or more bores 250 disposed linearly along the length of the shaft. In some embodiments, a locking device 100 is attached to a first shaft 210. In some embodiments, a locking device 100 is attached to the end of a first shaft 210. In some embodiments, a locking device 100 of the present invention comprises a pin or bolt 160. In some embodiments, when the locking device 100 on the first shaft 210 is properly aligned with a bore 250 on the second shaft 220, the pin or bolt 160 is aligned with the bore 250, and the pin or bolt 160 is configured to insert into the bore 250, thereby locking the position of the device 100 and the first shaft 210 along the second shaft 220. In some embodiments, a locking device 100 comprises a bias device (e.g. a spring), attached to the pin or bolt 160, which causes the pin or bolt to automatically insert into a bore 250, when properly aligned. Insertion of the pin or bolt 160 into a bore 250 in the second shaft 220 precludes movement of the locking device 100 and first shaft 210 along the length of the second shaft 220. In some embodiments, insertion of a pin or bolt 160 into a bore 250 in the second shaft 220, places the first shaft 210 and second shaft 220 into a locked and/or engaged conformation. In some embodiments, a locked and/or engaged conformation between the first shaft 210 and second shaft 220 denies movement of a support element 220 from closed to open and/or open to closed conformations.

Figure 1:
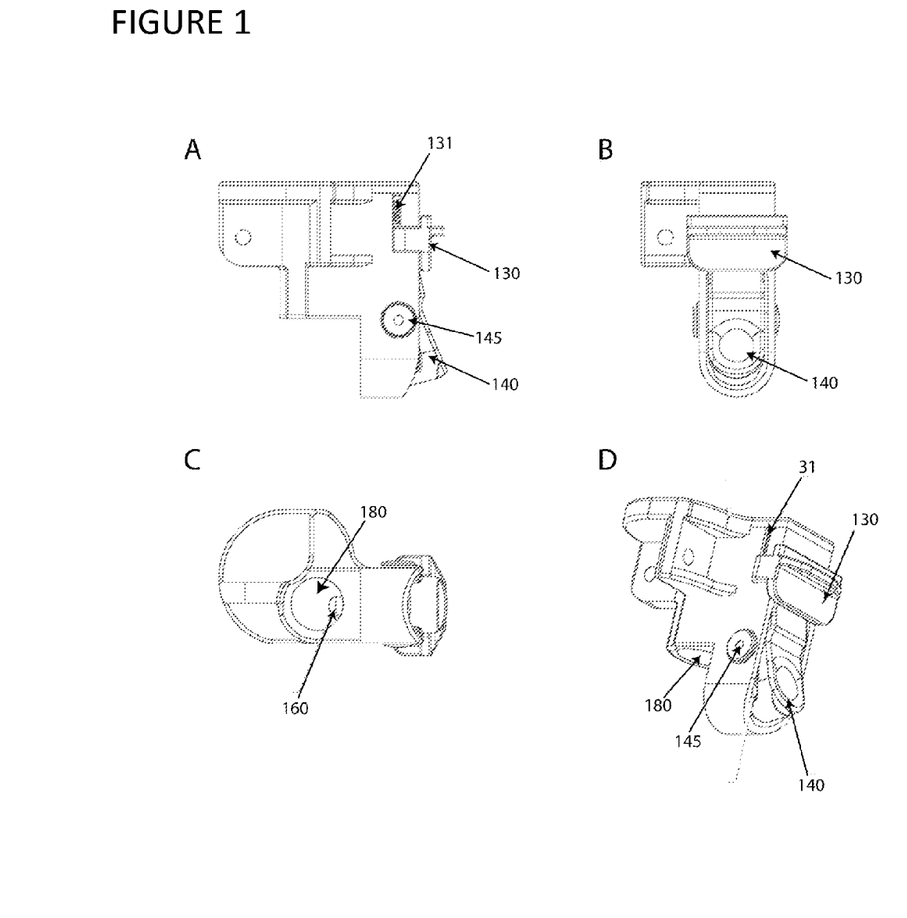
FIG. 1 shows illustrations of an exemplary locking device in the locked conformation: (A) side view; (B) rear view; (C) top view; and (D) rear/side/bottom view.

In preferred embodiments, disengaging a pin or bolt 160 from a support element 200 bore 250 requires multiple affirmative steps (e.g. 2 affirmative steps). In some embodiments, disengagement and/or unlocking steps must be performed consecutively, and in a specified order. In some embodiments, any suitable combination of locking mechanisms (e.g. button 140, lever 140, cover 130, slide 130, latch, etc.) finds use in the present invention. In some embodiments, a two-step locking mechanism combines a push-button 140 and a sliding cover 130 (SEE FIGS. 1-2). In some embodiments, a disengagement push-button 140 and/or disengagement lever 140 pivots at a pivot point 145. In some embodiments, a sliding cover 130 moves along one or more (e.g. 1, 2, 3, 4, etc.) cover gloves 131. In some embodiments, a disengagement push-button 140 and/or disengagement lever 140 provides the force to withdraw a pin or bolt 160 from a support element 200 bore 250. However, in preferred embodiments, access to a disengagement button 140 and/or disengagement lever 140 is impeded by one or more additional unlocking mechanisms. In other preferred embodiments, movement and/or depression of a disengagement button 140 and/or disengagement lever 140 is impeded by one or more additional unlocking mechanisms. In some embodiments, a cover element 130 sits over all or a portion of a disengagement button and/or disengagement lever, thereby impeding access to or movement of the disengagement button 140 and/or disengagement lever 140. In some embodiments, a cover element 130 comprises a bias device (e.g. a spring), which causes the cover element 130 to automatically adopt a position covering all or a portion of the disengagement button 140 and/or disengagement lever 140. In some embodiments, the cover element 130 must be manually and affirmatively moved (e.g. slid) to reveal and/or unimpede the disengagement button 140 and/or disengagement lever 140. The unimpeded disengagement button 140 and/or disengagement lever 140 can be depressed to withdraw the pin or bolt 160 from the support element 200 bore 250, thereby allowing movement of the locking device 100, and/or an associated portion of a support element 210, along the support element 200 or a portion thereof 220. In some embodiments, withdrawing the bolt or pin 160 from the support element 200 bore 250, allows movement of the support element 200, and reconfiguring of the piece of furniture 50 (e.g. folding, unfolding, etc.).

In some embodiments, a locking device 100 of the present invention attaches to, is part of, and/or is integrated into one or more support elements 200 (e.g. leg, leg portion, etc.) of a piece of furniture 50. In some embodiments, a support element 200 comprises two or more shaft elements (See, e.g., U.S. Pat. No. 7,293,826 and U.S. Pat. No. 7,219,955, herein incorporated by reference in their entireties) (SEE FIG. 4). In some embodiments, a support element comprises an inner shaft 220 and an outer shaft 210. In some embodiments, inner shafts 220 and outer shafts 210 are configured to adopt a piston-like conformation. In some embodiments, the inner shaft 220 slidably engages the outer shaft 210. In some embodiments, the outer shaft 210 is configured to slide over, and encompass, the inner shaft 220. In some embodiments, the inner shaft 220 nests slidably within the outer shaft 210. In some embodiments, a locking device 100 of the present invention is attached to or integrated into the opening in an outer shaft 210. In some embodiments, a locking device 100 of the present invention is attached to or integrated into the opening in an outer shaft 210 that engages the inner shaft 220. In some embodiments, an inner shaft 220 comprises one or more bores 250 disposed linearly along the length of the inner shaft 220. In some embodiments, a locking device 100 attached to the outer shaft 210 comprises a pin or bolt 160. In some embodiments, when the outer shaft 210 locking device 100 is properly aligned with the inner shaft 220 bore 250 along the inner shaft 220, the pin or bolt 160 is aligned with the bore 250, and the pin or bolt 160 is configured to insert into the bore 250, thereby locking the position of the locking device 100 and outer shaft 210 with respect to the inner shaft 220. In some embodiments, a locking device 100 comprises a bias device (e.g. a spring), attached to the pin or bolt 160, which causes the pin or bolt 160 to automatically insert into an inner shaft 220 bore 250, when properly aligned. In some embodiments, the bias device causes automatic locking of the inner 220 and outer 210 shafts when they reach proper alignment. Insertion of the pin or bolt 160 into an inner shaft 220 bore 250 precludes movement of the locking device 100 and outer shaft 210 along the length of the inner shaft 220. In some embodiments, insertion of a pin or bolt 160 into an inner shaft 220 bore 250 places the inner shaft 220 and outer shaft 210 into a locked and/or engaged conformation. In some embodiments, a locked and/or engaged conformation denies movement of the outer shaft 210 with respect to the inner shaft 220. In some embodiments, a locked and/or engaged conformation denies movement of the inner shaft 220 with respect to the outer shaft 210. In some embodiments, a locked and/or engaged conformation denies movement of a support element 200 from a closed conformation to an open conformation. In some embodiments, a locked and/or engaged conformation denies movement of a support element 200 from an open conformation to a closed conformation. In preferred embodiments, disengaging the pin or bolt 160 from an inner shaft 220 bore 250 requires multiple affirmative steps. In some embodiments, disengagement and/or unlocking steps must be performed consecutively, and in a specified order. In some embodiments, a disengagement push-button 140 and/or disengagement lever 140 provides the force to withdraw a pin or bolt 160 from an inner shaft 220 bore 250. However, in preferred embodiments, access to a disengagement button 140 and/or disengagement lever 140 is impeded by one or more additional locking mechanisms. In other preferred embodiments, movement and/or depression of a disengagement button 140 and/or disengagement lever 140 is impeded by one or more additional unlocking mechanisms. In some embodiments, a cover element 130 sits over all or a portion of a disengagement button 140 and/or disengagement lever 140, thereby impeding access to or movement of the disengagement button 140 and/or disengagement lever 140. In some embodiments, a cover element 130 comprises a bias device (e.g. a spring), which causes the cover element 130 to automatically adopt a position covering all or a portion of the disengagement button 140 and/or disengagement lever 140. In some embodiments, the cover element 130 must be manually and affirmatively moved (e.g. slid) to reveal and/or unimpede the disengagement button 140 and/or disengagement lever 140. The unimpeded disengagement button 140 and/or disengagement lever 140 can be depressed to withdraw the pin or bolt 160 from the inner shaft 220 bore 250, thereby allowing movement of the locking device 100 and outer shaft 210 along the inner shaft 220. In some embodiments, withdrawing the bolt or pin 160 from the support element 200 bore 250, allows movement of the outer shaft 210 along the inner shaft 220, and reconfiguring of the piece of furniture 50 (e.g. folding, unfolding, etc.).

In some embodiments, a furniture 50 support element 200 comprises a support shaft 200. In some embodiments, a locking device 100 must move along the length of a support shaft 200 to reconfigure the piece of furniture 50 from an open to closed and/or closed to open conformation (SEE FIG. 5). In some embodiments, the ends of one or more secondary support elements 230 abut the support shaft 200. In some embodiments, the ends of one or more secondary support elements 230 attach to a locking device 100 which encompasses the support shaft 200. In some embodiments, the ends of one or more secondary support elements 230 move along the length of the support shaft 200 when the piece of furniture 50 is moved from open to closed and/or closed to open conformations. In some embodiments, the ends of one or more secondary support elements 230 and a locking device 100 move along the length of the support shaft 200 when the piece of furniture 50 is moved from open to closed and/or closed to open conformations. In some embodiments, support shaft 200 comprises one or more bores 250 disposed linearly along the length of the support shaft 200. In some embodiments, the support shaft 200 runs through an opening in the locking device 100. In some embodiments, the locking device 100 comprises a pin or bolt 160. In some embodiments, when the locking device 100 is properly aligned with a bore 250 along the support shaft 200, the pin or bolt 160 is aligned with the bore 250, and the pin or bolt 160 is configured to insert into the bore 250, thereby automatically locking the position of the locking device 100, and any associated secondary support elements 230, with respect to the support shaft 200, as described above. Insertion of the pin or bolt 160 into support shaft 200 bore 250 precludes movement of the locking device 100 and secondary supports 230 along the length of the support shaft 200. In some embodiments, insertion of a pin or bolt 160 into a support shaft 200 bore 250 places the support shaft 200 and secondary supports 230 into a locked and/or engaged conformation. In some embodiments, a locked and/or engaged conformation denies movement of the secondary supports 230 with respect to the support shaft 200. In some embodiments, a locked and/or engaged conformation denies movement of a support shaft 200 and secondary supports 230 from a closed conformation to an open conformation. In some embodiments, a locked and/or engaged conformation denies movement of a support shaft 200 and secondary supports 230 from an open conformation to a closed conformation. In preferred embodiments, disengaging the pin or bolt 160 from a support shaft 200 bore 250 requires multiple affirmative steps, which must be performed consecutively, and in a specified order, as described above.

In some embodiments, a support 200, shaft 200, and or leg 200 comprises more than on bore 250 disposed along its length. Multiple bores 250 allow a piece of furniture 50 to be locked in more than one position. In some embodiments, two bores 250 on a support element 200 allow a piece of furniture 50 to be automatically locked in an open position and a closed position. In some embodiments, multiple bores 250 on a support element 200 allow a piece of furniture 50 to be locked in multiple different open conformations (e.g. varying levels of openness, vary levels of recline, etc.).

In some embodiments, one leg 200 or support 200 of a piece of furniture 50 comprises a locking device 100 of the present invention. In some embodiments, more than one leg 200 or support 200 of a piece of furniture 50 comprises a locking device 100 of the present invention. In some embodiments, each leg 200 or support 200 of a piece of furniture 50 comprises a locking device 100 of the present invention (e.g. 3 locking devices, 4 locking devices).

In some embodiments, a locking device 100 of the present invention is attached to, or integrated into, a support 200 or leg 200 of a piece of furniture 50. In some embodiments, a locking device 100 of the present invention can be attached to the leg 200 and/or support 200 of an existing piece of furniture 50. In some embodiments, a locking device 100 comprises a support engagement element 180 which connects the locking device 100 to a support element 200. In some embodiments, a support engagement element 180 is a cavity which runs through the locking device 100 and allows the support element 200 to be surrounded by the locking device 100. In some embodiments, a support engagement element 180 provides permanent attachment of a locking device 100 to a support element 200. In some embodiments, a support engagement element 180 allows a locking device 100 to be removed, repositioned, and/or replaced on a support element 200.

In some embodiments, both an inner shaft 220 and an outer shaft 210 comprise bores 250. In some embodiments, a pin or bolt 160 on a locking device 100 extends through the bores 250 on both the inner shaft 220 and outer shaft 210, thereby locking the position of the locking device 100, inner shaft 220 and outer shaft 210. In some embodiments, a locking device 100 comprises a bore 150 and a support element 200 comprises a pin or bolt 260. In some embodiments, a locking device 100 bore 150 and a support element 200 pin or bolt 260 engage and disengage in a manner corresponding to the embodiments describe above for the reverse configuration.

We claim:
1. A folding chair comprising a locking device, said locking device comprising: a first mechanism, wherein said first mechanism has a locked conformation and an unlocked conformation; a second mechanism, wherein said second mechanism has a locked conformation and an unlocked conformation; a locking mechanism, wherein said locking mechanism has a locked conformation and an unlocked conformation; and a support engagement element, wherein said support engagement element attaches said locking device to a support element;

wherein said locked conformation of said locking mechanism impedes movement of said locking device along said support element, wherein said locked conformation of second mechanism impedes unlocking of said locking mechanism, and wherein said locked conformation of first mechanism impedes unlocking of said second mechanism;

wherein unlocking of said first mechanism allows unlocking of said second mechanism, wherein unlocking of said second mechanism unlocks said locking mechanism, and wherein unlocking of said locking mechanism allows movement of said locking device along said support element;

wherein said first mechanism must be unlocked prior to unlocking said second mechanism, wherein said second mechanism results in unlocking said unlocking mechanism, and wherein said unlocking mechanism, must be unlocked prior to movement of said locking device along said support element;

wherein said first mechanism is slidably movable along a longitudinal axis of said support element;

wherein said support element comprises a leg of said folding chair;

wherein in a locked conformation said locking device holds said folding chair in an unfolded configuration, and in an unlocked conformation said locking device allows movement of said folding chair into a folded configuration;

wherein said locking mechanism comprises a bolt, said support element comprises two or more bores, and said locked conformation of said locking mechanism comprises insertion of said bolt into one of said bores, wherein said bolt automatically inserts into one of said bores upon proper alignment of said bolt with one of said bores;

wherein unlocking said first mechanism requires an affirmative step, and wherein unlocking said second mechanism requires a second affirmative step;

wherein said first mechanism comprises a slidable cover that is slidably movable along a longitudinal axis of said support element, wherein said second mechanism comprises a push-button, and wherein said slidable cover is slidably movable relative to said push-button;

wherein said locked conformation of said slidable cover impedes access to or, movement of, said push-button;

wherein said slidable cover automatically adopts a locked conformation, wherein an affirmative step is required to move said slidable cover into an unlocked position, and wherein moving said slidable cover into said unlocked position unlocks said first mechanism and provides access to said push-button;

wherein the affirmative step of depressing said push-button unlocks said second mechanism, thereby unlocking said locking mechanism;

wherein depressing said push-button withdraws said bolt from said bore;

wherein said affirmative step to move said slidable cover into said unlocked position, and said affirmative step depressing said push button, unlock said locking mechanism and allow movement of said locking device along said support element, only when performed in sequential order;

wherein movement of said locking device along said support element comprises movement over said support element;

wherein said locking device is stably attached to a first portion of said support element, and movement of said locking device along said support element comprises movement of said locking device and said first portion of said support element over a second portion of said support element.

wherein movement of said locking device along said support element is required for movement of said folding chair from a first conformation to a second conformation;

wherein said locked position of said locking mechanism restricts movement from said first conformation to said second conformation.

wherein said unlocked position of said locking mechanism allows movement from said first conformation to said second conformation.

wherein said first conformation comprises an unfolded conformation and said second conformation comprises a folded conformation.

2. A method comprising: a) providing the folding chair of claim 1; and b) conducting said affirmative step and said second affirmative step.

* * * * *